April 7, 1970 — E. PLUMAT — 3,505,049
PROCESS AND APPARATUS FOR ELECTROCHEMICAL MODIFICATION OF GLASS
Filed May 4, 1966 — 4 Sheets-Sheet 1

Inventor:
Emile Plumat
By: Spencer & Kaye
Attorneys

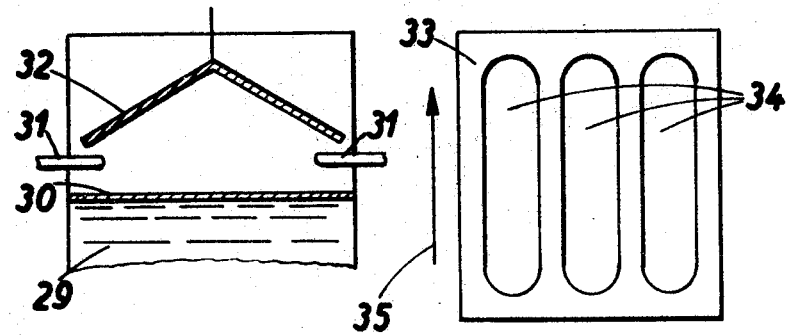
Fig. 4
Fig. 5.
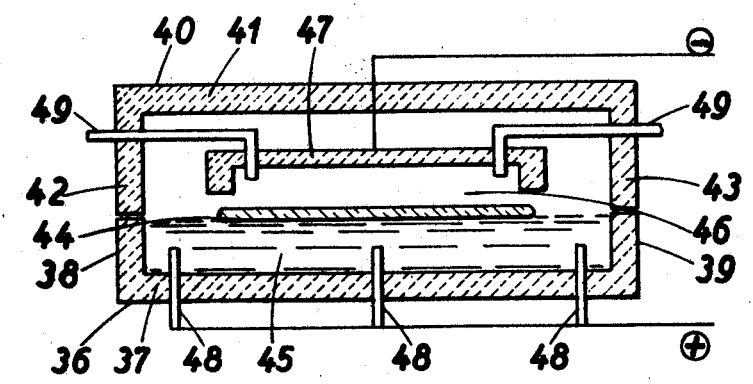
Fig. 6.
Inventor:
Emile Plumat
By: Spencer & Kaye
Attorneys Inventor:
Emile Plumat
By: Spencer & Kaye
Attorneys

United States Patent Office 3,505,049
Patented Apr. 7, 1970

3,505,049
PROCESS AND APPARATUS FOR ELECTRO-
CHEMICAL MODIFICATION OF GLASS
Emile Plumat, Gilly, Belgium, assignor to Glaverbel S.A.,
Brussels, Belgium
Continuation-in-part of application Ser. No. 286,302,
June 7, 1963. This application May 4, 1966, Ser.
No. 547,519
Claims priority, application Luxembourg, May 6, 1965,
48,532
The portion of the term of the patent subsequent
to July 23, 1985, has been disclaimed
Int. Cl. C03c 21/00; C03b 18/00
U.S. Cl. 65—30                                       14 Claims

ABSTRACT OF THE DISCLOSURE

A process and associated apparatus for electrochemical modification of glass which includes floating a sheet of glass with one side in contact with a higher density, molten ion source with a gaseous atmosphere ion source contacting the opposite surface of the glass, and providing an electric field with variable polarity between the molten and gaseous materials so as to effect controlled diffusion of ions in, into, out of or away from the glass, with apparatus including a molten material vessel, gaseous atmosphere discharge element and electrodes.

---

This application is a continuation-in-part of my co-pending application Ser. No. 286,302, filed June 7, 1963, now abandoned.

The present invention relates to the manufacture of glass, and particularly to a process and apparatus for modifying the properties of sheet glass during manufacture.

It is already known to subject glass sheets to a heat treatment by bringing them into contact with a hot gas containing atoms or ions of a suitable type. The purpose of this is to effect an ion exchange between the glass and the gas with which it is in contact so as to produce a substantial modification in the composition of at least the glass surface layer which is in contact with the hot gas. It has been found, however, that it is impossible to control such a technique in order to achieve any reasonable consistency in the final composition of the glass sheet. In fact, it has been found that this technique is often harmful to the glass and most often produces modifications which are substantially different from those desired.

It is also already known that, in the case where such an ion exchange is carried out while the glass is in contact with a molten metal salt, the ion exchange between the metal salt and the glass can be so intense as to produce substantial undesirable changes in the properties of the glass. In order to avoid this undesirable result, it has already been proposed to control the ion exchange by passing a controlled electric current through the glass and the metallic salt. In order to effect such a control, it would be necessary to completely surround the glass with the molten material. However, serious difficulties and complications have been encountered when it was attempted to provide such an arrangement.

It is a primary object of the present invention to eliminate these drawbacks and difficulties.

It is a more specific object of the present invention to subject glass sheets to a novel process for modifying their properties in an accurately controlled manner.

Another object of the present invention is the provision of apparatus for carrying out this process.

These and other objects according to the present invention are achieved by means of a method for imparting desired properties to a glass sheet, which process includes the steps of supporting such sheet on a mass of molten material, maintaining a gaseous atmosphere in contact with such sheet, and applying an electric field through such sheet between the molten mass and the atmosphere.

The present invention also involves apparatus for carrying out the above method. This apparatus essentially includes means defining a vessel for holding a bath of molten material on which such sheet is to be supported and for maintaining a gaseous atmosphere above, and in contact with, such sheet. The novel apparatus also includes means for applying at least one electric field between such molten bath and such atmosphere so as to pass through such sheet when it is supported on such bath.

It has been found that the present invention permits modifications in the composition of glass sheets to be effected with great ease and accuracy.

The precise effect produced by the electric field depends, in each case, on the direction of such field, i.e., the polarity of the potential imparted to the molten material with respect to the atmosphere, and on the composition of the molten material and/or the atmosphere with respect to that of the glass. A proper selection of these parameters permits any one of a wide variety of modifications to be achieved.

Additional objects and advantages of the present invention will become apparent upon consideration of the following description when taken in conjunction with the accompanying drawings in which:

FIGURE 4 is a view similar to that of FIGURE 2 of still another modified form of construction of a portion of the arrangement of FIGURE 1.

FIGURE 5 is a plan view of still another modified version of one of the elements of the arrangement of FIGURE 1.

FIGURE 6 is an elevational, cross-sectional view of another arrangement according to the present invention.

Figure 1:
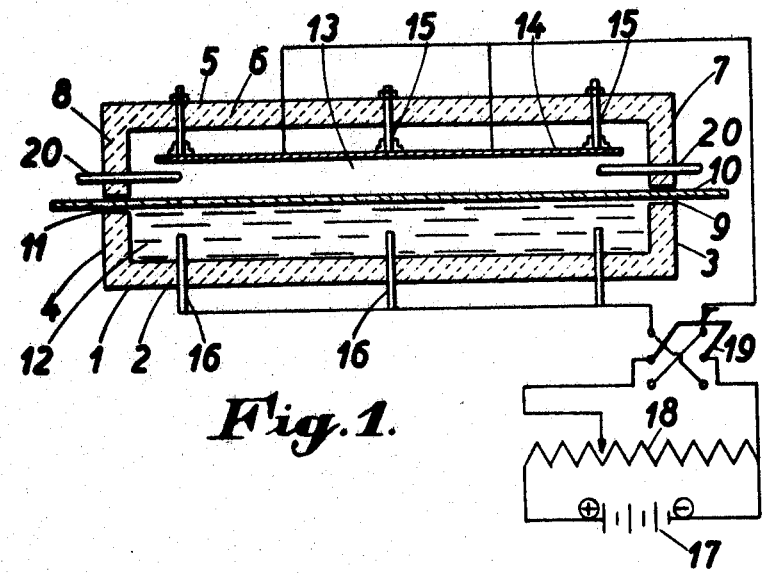
FIGURE 1 is a partially schematic, partially elevatioal, cross-sectional view of a first arrangement according to the present invention.

Referring first to FIGURE 1, there is shown a vessel, or tank, 1 constituted by a sole portion 2, an upstream lower side wall 3, a downstream lower side wall 4, and a cover member 5 which includes a lid portion 6, an upstream side wall 7, and a downstream upper side wall 8. Between the side walls 3 and 7, which are disposed at the upstream end of the enclosure defined by tank 1, there is provided an opening 9 through which a glass sheet or strip 10 enters the tank 1. The strip 10 exits from the tank through an opening 11 provided between the side walls 4 and 8 disposed at the downstream end of the tank.

Tank 1 is filled to the level of openings 9 and 11 with a bath 12 of molten material, such as tin for example, which has a higher density than the glass strip 10. When such a strip 10 passes through the tank, it will slide on the surface of bath 12 and its upper surface will be in communication with a free space 13 extending below the lid portion 6.

Within space 13 there is disposed a horizontal plate electrode 14 which is attached to lid portion 6 by means of attachment pieces 15. There are also provided three electrodes 16 which extend through the sole 2 of tank 1 and which project upwardly into the bath 12.

The electrodes 14 and 16 are connected to a D.C. voltage source 17 so as to cause a D.C. electric field to extend between bath 12 and the atmosphere maintained in space 13, this field thus passing through any glass strip present in the tank. In the illustrated arrangement, the electrode 14 is positive with respect to the electrodes 16. The electrodes 14 and 16 are connected to the voltage source 17 by means of a polarity reversing switch 19 so that the electrodes can be placed at either polarity with respect to one another. Connected between voltage source 17 and switch 19 is a device 18, here in the form of a potentiometer, for permitting the voltage between the electrodes to be varied.

The tank is also provided with injector tubes 20 made of refractory material and each extending into space 13 through a respective one of the side walls 7 and 8 for introducing into space 13 the ions to be diffused into the glass sheet or strip 10.

During the movement of the glass strip 10 through the tank 1, the electrodes 14 and 16 remain connected to the positive and negative poles, respectively, of the voltage source 17. As a result, a potential difference is maintained between the electrodes so that the bath 12, the strip 10, and the atmosphere in space 13 above this strip form an electrochemical system in which positive ions move downwardly in a direction from electrode 14 to bath 12.

If, as in the present case, the atmosphere in space 13 contains free ions, such ions will diffuse into the glass, provided that the polarity of the ions is the same as that of electrode 14. Whether, and to what extent, such diffusion will take place, in any given case, will depend on the mobility of the ions, the strength of the electrical field, and the electrical value of the diffusion barrier constituted by the glass atmosphere interface. Such diffusion can be controlled merely by controlling the strength of the electric field.

If ions are to be diffused from the atmosphere into the glass, the required concentrations of ions in the atmosphere may be maintained by continuously or intermittently introducing such ions into the atmosphere in the vicinity of the electric field through tubes 20. This permits the nature and concentration of the ions to be rapidly altered when desired. Also, if desired, different ions may be simultaneously introduced into the atmosphere for diffusion into the glass and, in such cases, the concentration of each type of ion present in the atmosphere can be independently controlled.

Depending on the composition of the glass strip 10 and of the molten bath 12, such a diffusion of ions from the atmosphere into the glass may be accompanied by a diffusion of ions from the glass into the molten bath. For example, metal ions contained in the glass can be caused to diffuse into the bath in situations where the glass contains metal ions having an appropriate electrical polarity with respect to that of the metal, or metals, constituting the bath. Such a diffusion of ions can, by itself, be beneficial in certain cases.

In one exemplary process according to the present invention, alkali metal ions can be caused to diffuse from the glass into the molten bath and, after neutralization, combine with impurities, such as sulphur or oxygen, in the bath, with the result that these elements will be rendered less harmful to the glass than they would be if they were to combine with metals forming part of the composition of the bath. It should be appreciated that this possibility is only mentioned by way of example and that, depending on the composition of the glass and of the bath, other effects may be produced. However, it should be understood that these effects are subsidiary to the main purpose of modifying the properties of the glass itself.

When a potential is applied between electrodes 14 and 16 in the arrangement of FIGURE 1, different phenomena occur at the upper and lower surfaces of the glass strip 10. At the tin glass interface, sodium ions move from the glass into the bath of tin and become neutralized. The polarity of the electric field eliminates any tendency for tin ions to migrate into the glass, thus avoiding any "bloom" which might result from such a migration. At the upper surface of the glass strip 10, i.e., the glass atmosphere interface, sodium ions which become displaced downwardly under the influence of the electric field are replaced by different ions which diffuse into the glass from the atmosphere enclosed in space 13.

In order to provide a more specific example of the process according to the present invention, reference will be made to actual experimental processes which were carried out on soda-lime glass in apparatus of the type shown in FIGURE 1. These experimental processes were carried out by introducing ionized lithium salts into the region between electrode 14 and strip 10 by means of tubes 20. The current flow in milliamperes between electrodes 14 and 16 was measured for various temperatures of the molten tin bath 12 and for various voltage potentials between the electrodes 14 and 16.

Figure 8:
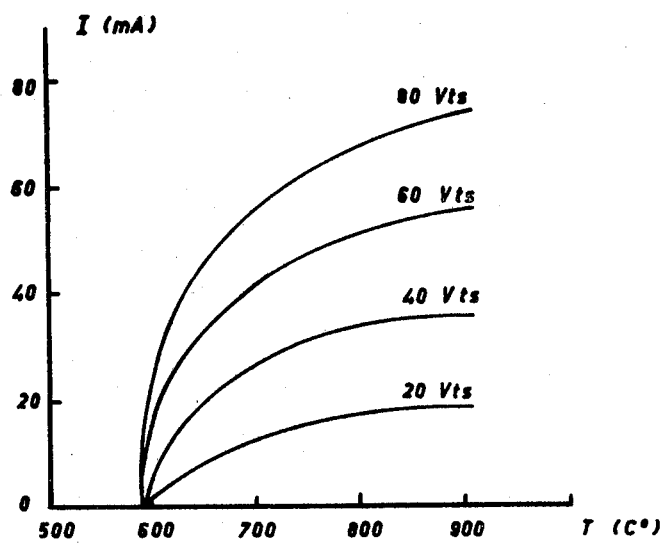
FIGURE 8 is a graph illustrating one parameter of the operation of the arrangements according to the present invention.

The results of these measurements are tabulated in the graph of FIGURE 8. The curves shown in this graph illustrate the manner in which the current varied as a function of the bath temperature for voltages of 20, 40, 60 and 80 volts. The distance between the upper electrode 14 and the bath of molten tin in which the three lower electrodes 16 were dipped, was about 15 mm. The amplitude of the current for each test run constitutes a measure of the rate at which lithium ions diffuse from the space 13 into the upper surface layer of the glass strip 10, these lithium ions replacing sodium ions originally contained in the glass and the sodium ions migrating downwardly within the glass. It may be seen that for any given temperature, the amplitude of the current varies proportionally with the applied voltage.

Subsequent tests carried out on the resulting glass sheets showed that as a consequence of the reinforcement of the glass surface with lithium, compressive forces were set up in the glass due to differential contraction during cooling. As a result, the mechanical strength of the glass was improved in the same manner as that resulting from conventional tempering treatments. It may therefore be seen that the present invention can be considered to permit a sort of chemical tempering to be effectuated. This chemical tempering can be performed even in the manufacture of relatively thin glass sheets having a thickness of less than 6 millimeters. It should be mentioned that conventional physical tempering treatments can not be successfully applied to glass sheets having a thickness of less than 6 millimeters.

By way of comparison, it has been found that sheet glass having a thickness of about 6 millimeters becomes subjected to compressive forces of the order of 8 kg./mm.$^2$ when tempered by conventional methods. In experimental processes according to the present invention which were carried out on a sheet of soda-lime glass having a thickness of 6 millimeters and using apparatus of the type shown in FIGURE 1, the diffusion of lithium ions into the surface of the sheet resulted in compressive forces of the order of 5.8 kg./mm.$^2$. In another experimental process according to the present invention, ionized magnesium salt was employed in place of the lithium salt and compressive forces of the order of 7.8 kg./mm.$^2$ were induced.

Other processes may be carried out according to the present invention for the purpose of creating a controlled diffusion of selected ions from the molten material into the glass. In order to cause such a diffusion to occur, it is only necessary to give the electric field between the electrodes 14 and 16 an appropriate polarity and amplitude and to appropriately select the composition of the molten mass in relation to the composition of the glass. Such a diffusion of ions into the glass will produce a modification of the glass composition at least in one surface layer thereof.

The composition of the atmosphere in space 13 and/or of the bath 12 may be properly chosen to produce any one of a variety of modifications. For example, they may be chosen so as to produce an improvement in the chemical properties of the glass or a modification in its mechanical or optical properties. It is also possible to substantially improve the resistance of the glass to corrosion by atmospheric or chemical agents by enriching a surface layer thereof with calcium or magnesium. Certain optical properties of the glass, such as its luster, may be improved by diffusing lead, tin, or barium into the glass. A tinting may be imparted to at least a portion of the glass sheet by diffusing into it ions of the following metals: iron, manganese, cobalt, copper, nickel and selenium.

According to other embodiments of the process of the present invention, the thermal expansion coefficient of glass can be appreciably modified by carrying out a diffusion which causes sodium ions in the glass to be replaced by other ions, such as those of lithium or potassium. As has been described in detail above, a diffusion of this type causes permanent compressive stresses to be generated in the glass sheet.

It is also possible to diffuse certain ions into the glass sheet, such as lithium ions for example, so as to produce a devitrification in one or more surface layers of the glass sheet.

It is additionally possible to carry out processes according to the present invention without creating a diffusion of ions into the glass either from the molten bath 12 or from the atmosphere contained in space 13. Instead, the electric field traversing the glass sheet can be employed to cause ions which are originally within the sheet itself to migrate from one surface region toward the opposite surface region thereof. It has been found that such a migration can produce beneficial modifications in the composition of at least one surface region of the sheet. For example, by causing alkali metal ions to migrate toward one surface of the sheet, the concentration of these ions at the opposite surface of the sheet can be reduced, thereby giving this other surface an improved resistance to the action of weathering agents.

While all of the processes according to the present invention which have thus far been described are intended to produce a uniform effect across the entire width of a glass sheet, it should be noted that the present invention is not limited to processes satisfying this condition. In other words, the present invention may also be carried out by localizing the electric field to a particular zone, or zones, across the entire surface area of the glass sheet so as to confine modifications of the glass composition to such zone or zones. For example, the electric field may be concentrated along the edges of the glass sheet in order to effectuate a modification of the properties of the glass in these regions. As a more specific example, the surface tension of the glass along its edges may be altered by varying the concentration of alkali metal ions in these regions. This will permit the thickness of a sheet of glass formed on a bath of a molten material having a higher density than the glass to be modified during the displacement of the sheet on the bath.

As may be seen from FIGURE 1, the means for producing the required electric field are constituted by electrodes disposed at various levels in the vessel 1. One or more electrodes, such as the electrodes 16, may be located so as to be immersed in the bath of molten material and one or more electrodes, such as the electrodes 14, may be disposed above the surface of such bath. The electrodes may be arranged as shown in FIGURE 1 to have a constant spacing and to produce a constant electric field strength across the entire region traversed by the field. However, the electrodes may also be constructed to have a variable spacing across this region and/or means may be provided for producing a time variation of the voltage between the electrodes. It is also possible to provide more than one lower electrode and/or one or more than one upper electrode and to produce an electric field having different field strengths in different regions either by maintaining individual upper and/or lower electrodes at different potentials or by varying the spacing between different pairs of upper and lower electrodes.

In order to provide an inter-electrode spacing which varies across the region traversed by the electric field, one electrode may be formed to have a planar surface which is inclined with respect to the other electrode. The one electrode may also be given a curved or angular configuration. It is also possible to effect a concentration of the electric field in various zones across the surface of the glass sheet by employing an electrode, or electrodes, which is provided with apertures opposite the surface regions of the glass sheet where the electric field is to be diminished or eliminated.

It is also possible to employ a portion of the vessel itself as one of the electrodes. For example, the sole 2 of the furnace can be made of electrically conductive material and can be connected to serve as the lower electrode.

Several arrangements according to the present invention for producing an electric field whose strength varies across the region traversed by the field are shown in FIGURES 2 to 7.

Figures 2, 3:
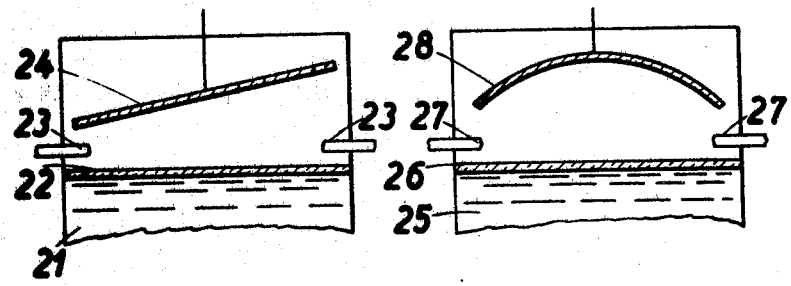
FIGURE 2 is an elevational, cross-sectional, detail view of a modified version of a portion of the arrangement of FIGURE 1.
FIGURE 3 is a view similar to that of FIGURE 2 of another modified version of a portion of the arrangement of FIGURE 1.

FIGURE 2 shows a detail of a portion of an arrangement of the type shown in FIGURE 1, the view of FIGURE 2 being taken along a vertical plane perpendicular to the plane of FIGURE 1, i.e., along a plane perpendicular to the movement of the glass sheet. The arrangement illustrated in this figure includes a molten bath 2 on top of which a glass strip 22 is moved. Injector tubes 23 are disposed above the glass strip. The lower electrode, or electrodes, is not visible in this figure but may be constituted by an arrangement identical with the electrodes 16 of FIGURE 1. The upper electrode 24 is constituted by a flat plate which is inclined with respect to the horizontal so as to cause the glass strip 22 to be traversed by an electric field whose strength varies progressively from one edge of the strip to the other. In the arrangement according to FIGURE 2, the field strength decreases progressively from the left-hand side of the strip to the right-hand side thereof. As a result, the properties of the left-hand side of the strip will be modified to a greater extent than those of the right-hand side thereof.

Referring now to FIGURE 3, there is shown an arrangement similar to that of FIGURE 2 wherein a glass strip 26 moves in a direction perpendicular to the plane of the figure on top of a bath 25 of molten material. Injector tubes 27 are disposed above glass strip 26. In this embodiment, the upper electrode 28 is given a curved shape with its edges closer to the glass strip than its center. When this arrangement is used, both edges of the glass strip will be subjected to a greater modification than the center thereof. The upper electrode 28 is preferably disposed symmetrically with respect to the longitudinal axis of the glass strip.

Referring now to FIGURE 4, which is also a view similar to that of FIGURE 2, the glass strip 30 moves on top of a bath 29 of molten material and the injector tubes 31 are disposed above the glass strip. The upper electrode 32 is constituted by two flat plates which are disposed at an angle with respect to one another, the electrode being disposed symmetrically with respect to the longitudinal axis of glass strip 30. An electrode having this configuration will produce an effect which is roughly similar to that produced by the electrode of FIGURE 3.

FIGURE 5 is a plan view of still another form which the upper electrode may have. In this figure, the upper electrode 33 is constituted by a flat plate having a plurality of elongated perforations 34 formed therein. The perforations extend parallel to the direction 35 of movement of the glass strip. When this electrode is employed, the electric field traversing the glass strip will be concentrated in the regions opposite the strip portions of electrode 33 which remain between the perforations 34. As a result, the glass strip will be subjected to a selective treatment along the portions thereof which lie opposite these strip portions of electrode 33.

Referring now to FIGURE 6, which is a view similar to that of FIGURE 1, but taken in a plane perpendicular to that of FIGURE 1, there is shown another embodiment according to the present invention which is constituted by an arrangement similar to that of FIGURE 1. The structure shown in this figure includes a tank 36 constituted by a sole 37, lower side walls 38 and 39, and a cover member 40 constituted by a lid 41 and upper side walls 42 and 43. The glass strip 44 to be treated moves on top of a bath 45 of a molten material which is denser than the glass.

The arrangement also includes an upper electrode 47 having the form of an inverted U and disposed in space 46 extending above the glass strip. There are also provided three lower electrodes 48 which pass through the sole 37 and extend into the bath 45. The lower electrodes 48 are all connected to the positive terminal of a voltage source (not shown), while the upper electrode 47 is connected to the negative terminal thereof. The voltage source may be similar to the one shown in FIGURE 1 and may be provided with a suitable polarity reversing switch.

Injector tubes 49 pass through the side walls 42 and 43 and through the horizontal portion of electrode 47 in order to introduce ions into the portion of space 46 extending between electrode 47 and glass strip 44. The strip 44 moves in a direction perpendicular to the plane of FIGURE 6.

According to one of the processes which can be carried out with the apparatus of FIGURE 6, the electrodes 47 and 48 are connected to a voltage source which is adjusted to provide a potential of 50 volts between the electrodes. The bath of molten tin in which were dipped the three lower electrodes 48, was distant by amounts of about 20 mm. from the central portion of the upper electrode 47 and 10 mm. from the lowest extremity of the wings of said electrode 47.

This potential will be sufficient to cause sodium ions to diffuse into the edge surfaces of the strip so as to modify the wetting angle thereof. This process represents an advantageous manner of obtaining a glass strip whose thickness is below the equilibrium thickness.

Figure 7:
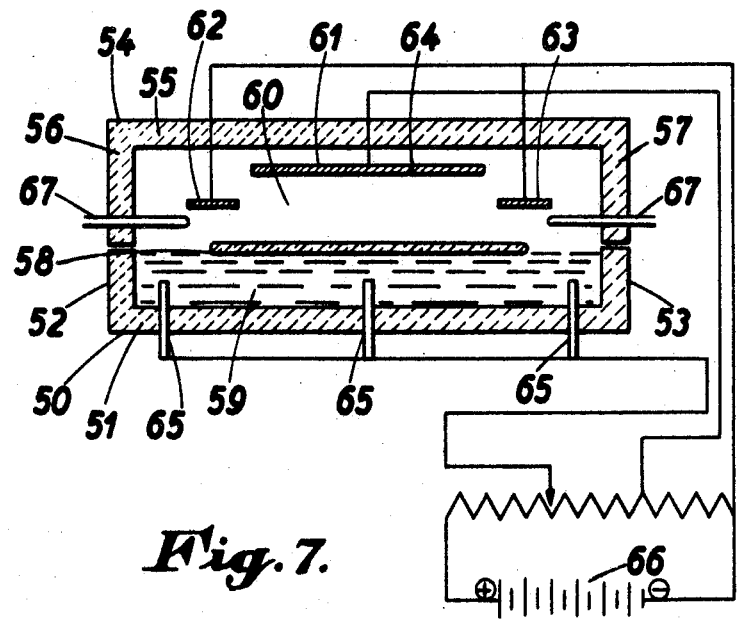
FIGURE 7 is a partly schematic, partly elevational, cross-sectional view of still another arrangement according to the present invention.

FIGURE 7 is a view similar to that of FIGURE 6 showing another arrangement according to the present invention. The tank 50 of this embodiment is constituted by sole 51, lower side walls 52 and 53, and a cover member 54 including a lid 55 and upper side walls 56 and 57. A glass strip 58 is disposed to slide on top of a bath 59 of a molten material which is denser than the glass, the glass moving in a direction perpendicular to the plane of the figure.

The electrode structure for this apparatus includes an upper electrode having a central member 64 and side members 62 and 63, the latter being disposed opposite respective edges of glass strip 58 and closer to the glass strip than central members 64. The lower electrode structure is constituted by three electrodes 65 which extend through sole 51 and into the bath 59. The electrodes are connected to a voltage source 66 in such a way that the lower electrodes 65 are more positive than the upper electrode 61. However, a more negative potential is applied to members 62 and 63 than to members 64 so as to cause a greater electric field strength to exist in the region of the edges of the glass strip 58 than in the central region thereof.

There are also provided injector tubes 67 made of a refractory material and extending through side walls 56 and 57 for introducing the required ions into the space 60 above strip 58.

By appropriately adjusting the voltages on the various members of electrode 61 so as to create appropriate field strengths in various regions across the glass strip, it is possible to effect a modification of the concentration of alkali metal ions contained in the edge regions of strip 58 so as to alter the surface tension of the glass strip edge portions. This permits the thickness of the glass strip to be given a value below the equilibrium thickness in a rapid and simple manner.

What is claimed is:

1. A method for imparting desired properties to a glass sheet containing exchangeable ions, which comprises:
  (a) supporting the glass sheet on a mass of molten metal or molten metal salt so that one surface of said sheet is in contact with the mass of molten material and the opposite surface of said sheet is in contact with a gaseous atmosphere;
  (b) applying an electric field through the glass sheet between said molten material and the gaseous atmosphere; and
  (c) effecting controlled diffusion of at least one type of ion in, into, out of or away from at least one surface region of said glass sheet; said controlled diffusion consisting essentially of (1) controlling diffusion of elements of the molten material into the glass sheet and/or producing migration of elements from the surface of said glass sheet which is in contact with said molten material to the interior of said glass sheet by imparting to the molten material a positive polarity with respect to the atmosphere or (2) decreasing diffusion of elements of the molten material into the glass sheet and/or increasing diffusion of elements of the atmosphere into the glass sheet and/or increasing migration of elements from the surface of said glass sheet which is in contact with the gaseous atmosphere to the interior of said glass sheet by imparting to the molten material a negative polarity with respect to the atmosphere.

2. A method according to claim 1 wherein at least one of said molten material and said gaseous atmosphere contain ions selected from the group consisting of lithium ions, potassium ions, calcium ions, barium ions, magnesium ions, lead ions, tin ions, iron ions, manganese ions, cobalt ions, nickel ions, selenium ions and copper ions and the electric field is applied in a direction and of an intenisty to effect beneficial control of said ions with respect to said glass sheet.

3. A method as defined in claim 2 wherein at least some of the ions which are caused to diffuse into such glass sheet are of a type which modifies at least one of the chemical, mechanical, or optical properties of such sheet.

4. A method as defined in claim 2 comprising the further step of introducing ions into a portion of said atmosphere which is traversed by said electric field during a period when such sheet is traversed by said field.

5. A method as defined in claim 1 wherein said step of applying an electric field is carried out by creating a field of a suitable intensity and direction, and wherein the composition of said molten material is suitably chosen with respect to that of such glass sheet for causing an electric field having such suitable intensity and direction to create a diffusion of metal ions from such sheet into said material.

6. A method as defined in claim 1 wherein said step of applying an electric field is carried out by causing said field to traverse less than the entire surface area of such sheet.

7. A method as defined in claim 6 comprising the further step of applying at least one additional electric field which extends between said molten material and said atmosphere and which traverses such sheet in a region other than that traversed by said first-mentioned electric field.

8. A method as defined in claim 7 wherein one of said electric fields traverses such sheet along the edge portions thereof.

9. A method as defined in claim 8 wherein the application of said one of said fields results in a different modification in the concentration of ions in such sheet edge portions.

10. Apparatus for imparting desired properties to a glass sheet, comprising, in combination:
   (a) means defining a vessel for holding a bath of molten metal or molten metal salt on which such sheet is to be supported and for maintaining a gaseous atmosphere above and in contact with, such sheet; and
   (b) means for applying at least one electric field between such molten bath and such atmosphere so as to pass through such sheet when it is supported on such bath.

11. Apparatus as defined in claim 10 wherein said means or applying at least one electric field is constituted by at least one lower electrode disposed below the level at which such sheet is to be disposed, and at least one upper electrode disposed in the region above the level at which such sheet is to be disposed for producing electric fields having different field strengths in various regions of such sheet.

12. Apparatus as defined in claim 11 wherein one of said electrodes is constituted by a flat plate having a plurality of apertures formed therein for causing said electric field to be discontinuous across the face of said one electrode.

13. Apparatus as defined in claim 11 wherein said electrodes are arranged for causing an electric field to traverse at least one edge of such glass sheet.

14. Apparatus as defined in claim 10 further comprising means for introducing ions into said vessel in a region above such bath of molten material.

References Cited

UNITED STATES PATENTS

| | | | |
|---|---|---|---|
| 2,596,515 | 5/1932 | Watkins et al. | 204—30 |
| 3,393,987 | 7/1968 | Plumat | 65—30 |
| 3,218,220 | 11/1965 | Weber | 161—1 |
| 3,337,322 | 8/1967 | Taylor | 65—32 |

FOREIGN PATENTS 620,787  8/1962  Belguim.

S. LEON BASHORE, Primary Examiner

J. H. HARMAN, Assistant Examiner

U.S. Cl. X.R.

65—32, 90, 196; 204—280